(12) United States Patent
Haque et al.

(10) Patent No.: US 7,298,898 B2
(45) Date of Patent: Nov. 20, 2007

(54) SYSTEM AND METHOD FOR IMAGE SEGMENTATION

(75) Inventors: Jamal Haque, Tampa, FL (US); James D. Parker, Tarpon Springs, FL (US); Michelle S. Wilcox, Largo, FL (US); Edward R. Prado, Palm Harbor, FL (US); John P. Prewitt, St. Petersburg, FL (US)

(73) Assignee: Honeywell International Inc., Morristown, NJ (US)

( * ) Notice: Subject to any disclaimer, the term of this patent is extended or adjusted under 35 U.S.C. 154(b) by 800 days.

(21) Appl. No.: 10/413,378

(22) Filed: Apr. 15, 2003

(65) Prior Publication Data

US 2004/0208364 A1    Oct. 21, 2004

(51) Int. Cl.
*G06K 9/34* (2006.01)

(52) U.S. Cl. .................. 382/173; 382/168; 382/171; 382/172

(58) Field of Classification Search .............. 382/260, 382/168, 171, 172, 266, 101, 302, 104, 103, 382/173; 600/454, 455; 340/937; 348/149
See application file for complete search history.

(56) References Cited

U.S. PATENT DOCUMENTS 6,017,309 A * 1/2000 Washburn et al. .......... 600/454
6,126,605 A * 10/2000 Washburn et al. .......... 600/454
6,130,967 A    10/2000 Lee et al. .................... 382/302
6,162,176 A * 12/2000 Washburn et al. .......... 600/454
6,379,306 B1 * 4/2002 Washburn et al. .......... 600/454
6,738,496 B1 * 5/2004 Van Hall .................... 382/101

OTHER PUBLICATIONS

N. Otsu, "A Threshold Selection Method from Gray-Level Histograms", *IEEE Transactions on Systems, Man, and Cybernetics*, vol. SMC-9, No. 1, pp. 62-66, Jan. (1979).
Zhang et al., "Resotration of Images Scanned from Thick Bound Documents", *IEEE*, pp. 1074-1077 (2001).

* cited by examiner

*Primary Examiner*—Anh Hong Do
(74) *Attorney, Agent, or Firm*—Fogg & Powers LLC

(57) ABSTRACT

An image segmentation apparatus, preferably integrally implemented in a device such as an FPGA, including a buffer memory for storing pixel data, a digital filter in communication with the buffer memory, the digital filter having programmable coefficients, a histogram generating module in communication with the buffer memory that generates a histogram of the pixel data, a statistics generating module in communication with the buffer memory that generates statistics regarding the pixel data, a threshold select module for selecting one of a plurality thresholds and an apply threshold module for applying the selected threshold to data stored in the buffer to generate exceedance data that exceed the selected threshold. In a preferred embodiment, a control module controls each of the buffer, histogram, statistics and threshold modules to control data flow, program filter coefficients and select the appropriate threshold.

27 Claims, 2 Drawing Sheets

SYSTEM AND METHOD FOR IMAGE SEGMENTATION

BACKGROUND

1. Field of the Invention

The present invention relates generally to digital signal processing. More specifically, the present invention relates to systems and methods for performing image segmentation using a plurality of functional units or modules, preferably implemented in an integrated electronic device, such as a field programmable gate array (FPGA) or application specific integrated circuit (ASIC).

2. Background of the Invention

Digital signal processing (DSP) is employed in many fields, one of which is image segmentation. Image segmentation is the ability to distinguish between, for example, an object of interest and a background, or another object that is not of interest. For example, image segmentation is often used in an image processing application that tracks or detects a particular object, such as lane markings on a road to perform automatic steering of a vehicle. In automatic steering, image processing must be rapid, especially if the vehicle is traveling at a relatively high speed.

Also, image processing in an automatic steering application preferably should be able to handle varying weather conditions and environments, such as rain, bright sunlight and night time driving. Such a range of possible driving conditions, however, poses significant problems to known image segmentation processes that rely on static processing techniques.

BRIEF SUMMARY OF THE INVENTION

To improve digital signal processing techniques, the present invention is directed to systems and methods for facilitating and improving the digital signal processing of an image received from a camera. The present invention is particularly useful for performing image segmentation, e.g., distinguishing between an object of interest and a background. In a preferred embodiment of the present invention, the system is implemented in a field programmable gate array (FPGA), which allows for substantial control over the individual functional units of the invention, as well as substantial control over the data flow between those functional units.

More specifically, the present invention preferably allows data to be passed through different functional units at different times such that data may actually pass through functional units several times before finally being output from the FPGA to an external device for further processing, as may be desired. One advantage of the present invention it that it is possible to apply different algorithms to incoming data using the same overall device. It is also possible, in accordance with the present invention, to implement real-time programming of coefficients that may be used in, e.g., filtering to smooth out or detect edges of an image.

In a preferred embodiment of the present invention, incoming pixel data is stored in memory, such as an external RAM, that operates as a buffer. In addition, a histogram of the received image data is generated to clearly identify the range and magnitude of pixel intensities. In a preferred implementation, the histogram is implemented with 1,024 bins and each pixel is represented by a 16 bit word.

Optionally, depending on how the FPGA is programmed to operate, the pixel data from the buffer is filtered using one or more different techniques known in the art. Advantageously, in accordance with the present invention, filter coefficients can be changed "on the fly" such that filter processing can be modified depending on the nature of incoming data.

After storage in memory and histogram generation (and possibly filtering), the image data from the memory (or that has been filtered) is preferably transferred to a statistics module that generates a set of statistics, including a mean and standard deviation, with respect to the respective pixel intensities. These statistics are subsequently used for threshold calculations.

Threshold calculations include determining, in one of several possible ways (as will be described in more detail later herein), a threshold that is appropriate for the data at hand and the level or type of image segmentation that is desired. After a threshold (or set of thresholds) is determined, it is employed in a threshold comparison module to determine which of the pixels in the image data exceed the threshold. Preferably, only those pixels that exceed the threshold are maintained and other pixels are reset to a predetermined intensity, e.g., zero, such that subsequent digital signal processing need not have to act on those pixels.

In a preferred embodiment of the present invention, it is possible to fine tune threshold levels using a real-time programmable control register. That is, it is possible to control a main control module via a general purpose processor to cause the main control module to update registers and thereby set variables in one or more modules to control the flow of data and/or operation of any given module.

The present invention, when implemented in an FPGA or, ultimately, an application specific integrated circuit (ASIC), has the capability to interface to an outside image collection system and process the received image to separate a background from a particular object of interest for, e.g., tracking. The present invention offers versatility in the sense that there are, as will be explained in more detail below, multiple thresholding capabilities that can be changed in real-time on a per frame basis. In addition, the present invention offers spatial filtering capabilities that can be implemented in several different ways since filter coefficients are preferably programmable.

The features of the present invention along with the attendant advantages thereof will be more fully appreciated upon a reading of the following detailed description in combination with the accompanying drawings.

DETAILED DESCRIPTION OF THE INVENTION

Figure 1:
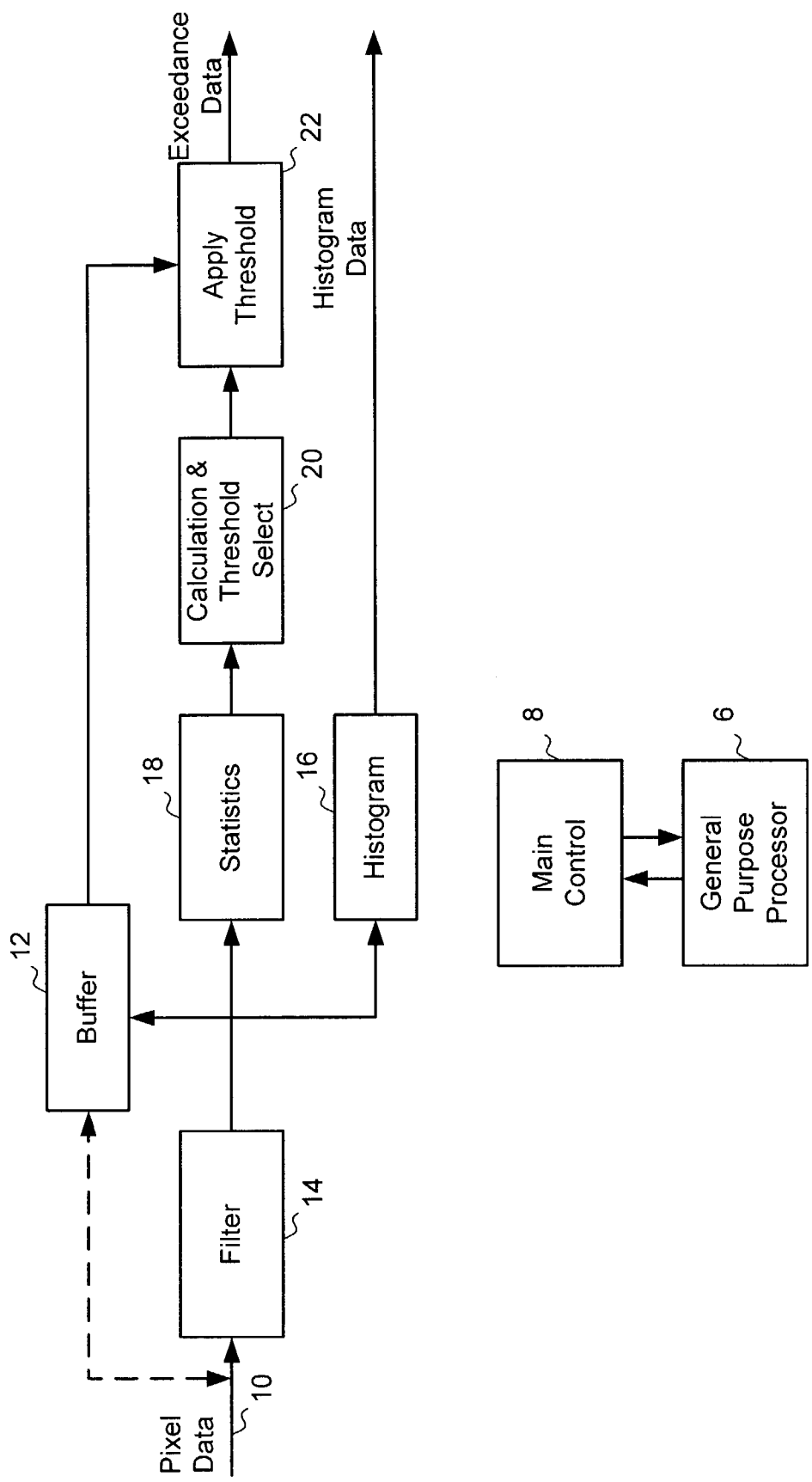
FIG. 1 is a block diagram of an exemplary implementation of a system in accordance with the present invention.

A significant aspect of the present invention is that data is passed through one or more modules multiple times such that different algorithms can be applied to incoming pixel data received from, e.g., a camera. Real time programmable filter coefficients and multiple passes there through allows a filter to be used in different modes for, e.g., smoothing or edge detection. FIG. 1 shows the several modules that act upon received pixel data in accordance with the present invention. A main controller 8, including one or more registers (not shown), preferably controls each of the modules by controlling the routing of data, by enabling the modules and by setting or selecting coefficients or other variables associated with the several modules. Although not shown, main control 8 is preferably connected to each of the modules described below to effect its control functions. Also, a general purpose processor 6 would typically operate in conjunction with the system of the present invention and would, therefore, be in communication with main control 8 using well-known techniques.

Referring to FIG. 1, in a first pass, streaming serial pixel data 10 are stored in buffer RAM 12, shown in FIG. 1. Optionally, pixel data 10 is passed through a filter 14. In a preferred embodiment, filter 14 comprises a spatial filter with a 5×5 kernel and programmable coefficients. Filter 14 is described more fully below.

In a preferred implementation, buffer RAM 12 is not implemented directly in a collective FPGA device since storing significant amounts of image data inside an FPGA would take limited FPGA resources away from the FPGA's overall processing capabilities. Internal FPGA storage of image data would also put limits on the size of an image that a given FPGA chip can handle. Having intermediate external storage capability (namely, buffer 12) allows the chip to be used with varying image sizes. Processing larger (N×N) images then only requires additional external ram.

After storage of the data in buffer RAM 12, histogram module 16 generates a histogram of the data. In a preferred implementation, the histogram comprises 1024 equally spaced bins into which are assigned the individual pixels based on their respective intensities/color. The intensities may be represented by a 16 bit word, but other sized variables could also be used to represent individual pixels.

Simultaneously with (or at least very near the time of) histogram generation, statistics regarding the data are generated in statistics module 18. In a preferred implementation, at least a mean $\mu$ and standard deviation $\sigma$ are calculated. In addition, an offset $\beta$ may also be set at this stage by direct input from general purpose processor 6 with which main control 8 interacts. These values are then employed in threshold calculations as explained next.

Threshold calculations are preferably implemented in threshold calculation & select module 20 and apply threshold module 22. In a preferred embodiment of the present invention, three different image segmentation threshold values can be implemented. A first value is one that is set to a pre-calculated value and received from general purpose processor 6.

A second and third type of threshold value can be calculated based on current real-time statistics received from statistics module 18. Specifically, a single pixel comparison can be implemented with the following formula:

$T=\sigma+\beta*\mu$ (mean, std deviation & offset)

Similarly, a threshold with respect to four neighboring pixels (a 2×2 array) may be implemented with the following formula:

$T=4*\sigma+\beta*\mu$ (mean, std deviation & offset)

As indicated in each of the above threshold values, the present invention preferably supports the possibility of employing an offset $\beta$ to the threshold value such that for each image frame processed, there can be two sets of data that represent exceedance pixels vis-à-vis the threshold value.

With a threshold value selected, the apply threshold module 22 receives image data from buffer 12 and applies the threshold value that was selected. Resulting exceedance pixels are then preferably written to an external ram (not shown). In the preferred embodiment of the present invention, calculation & select threshold module 20 is controllable via a register for fine tuning the threshold depending on the particular environment or nature of the image data that is being processed.

As mentioned previously, filter 14 may be employed to smooth image data or to detect edges of an image. In a preferred implementation, filter 14 is a spatial filter having a 5×5 image mask with 25 programmable coefficients. Such filters are well known in the art and will not be described herein except to say that 25 parallel and pipelined multipliers with adders allow the filter to run in optimum cycles. The programmable filter coefficient allows the filter to be used in virtually any type of spatial filtering operation, such as Smoothing filtering, Convolutional filtering for image de-blurring, and the like. A fixed point full precision arithmetic filter is preferably implemented to accommodate the full precision needed for the fourteen or sixteen bit pixel size and sixteen bit coefficient math. For each addition operation a separate adder is used to avoid throughput delays and intermediate overflows.

As will be appreciated by those skilled in the art, the present invention provides an image processing system that is particularly useful for tracking or object detection, which might be a critical functional component of an automatic steering system for a vehicle. For an automatic steering system, incoming fast imagery must be processed to extract objects of distinct characteristics such as a lane dividing line that can then be used to determine which direction to steer the vehicle.

The image processing system according to the present invention has the capability to interface to such a system, process the image, and separate the background from the object of interest for tracking. The present invention provides multiple thresholding capabilities that can be changed in real-time on a per frame basis in view of the continuous generation of statistics and their use in threshold calculation processes. In addition, spatial filtering is provided in such a way that different modes of the filter can be implemented by programming the filter with different coefficients. The following is an instance in which it is desirable to have dynamic threshold calculation.

Change of threshold: For case where an object of interest is moving toward or away from the camera, the energy in each pixel will change accordingly. This requires that the system, on a real time basis, be able to adjust its threshold. Such is the case for the real time calculation of thresholds based on background statistics.

The following is an example of filter selection, which is typically a function of the application at hand. The following is an example of uniform smoothing filter:

$$\text{Uniform Smoothing filter}$$
$$\begin{pmatrix} 0.04 & 0.04 & 0.04 & 0.04 & 0.04 \\ 0.04 & 0.04 & 0.04 & 0.04 & 0.04 \\ 0.04 & 0.04 & 0.04 & 0.04 & 0.04 \\ 0.04 & 0.04 & 0.04 & 0.04 & 0.04 \\ 0.04 & 0.04 & 0.04 & 0.04 & 0.04 \end{pmatrix}$$

While the present invention has been impliedly described thus far as operating filter 14 only once per frame, it is also possible to employ filter 14 multiple times before a histogram or statistics are generated, by looping data output from filter 14 back to buffer 12 and then re-inputting that buffer data back to filter 14. Accordingly, the filter can be employed multiple times for a single image segmentation process. For example, in the case of edge detection, two different filter coefficients are preferably run to get a single result. The Sobel filter which enhances edges in all directions is a good example. It is implemented through two independent convolutions (spatial filtering) with the coefficient kernel. The following are the two filter that would be used, once with no rotation and then by 90 degrees rotation. The results of each kernel run are combined to form the final result.

Sobel fitler (0 degrees)

$$\begin{pmatrix} 0.00 & 0.00 & 0.00 & 0.00 & 0.00 \\ 0.00 & 1.00 & 2.00 & 1.00 & 0.00 \\ 0.00 & 0.00 & 0.00 & 0.00 & 0.00 \\ 0.00 & -1.00 & -2.00 & -1.00 & 0.00 \\ 0.00 & 0.00 & 0.00 & 0.00 & 0.00 \end{pmatrix}$$

Sobel fitler (90 degrees)

$$\begin{pmatrix} 0.00 & 0.00 & 0.00 & 0.00 & 0.00 \\ 0.00 & 1.00 & 0.00 & -1.00 & 0.00 \\ 0.00 & 2.00 & 0.00 & -2.00 & 0.00 \\ 0.00 & 1.00 & 0.00 & -1.00 & 0.00 \\ 0.00 & 0.00 & 0.00 & 0.00 & 0.00 \end{pmatrix}$$

Thus, the present invention, by incorporating several components together as shown, and controlling when and how those components operate on data, enables increased image processing speed, which is particularly useful in real time applications where image data is preferably acted upon on a frame-by-frame basis.

Figure 2:
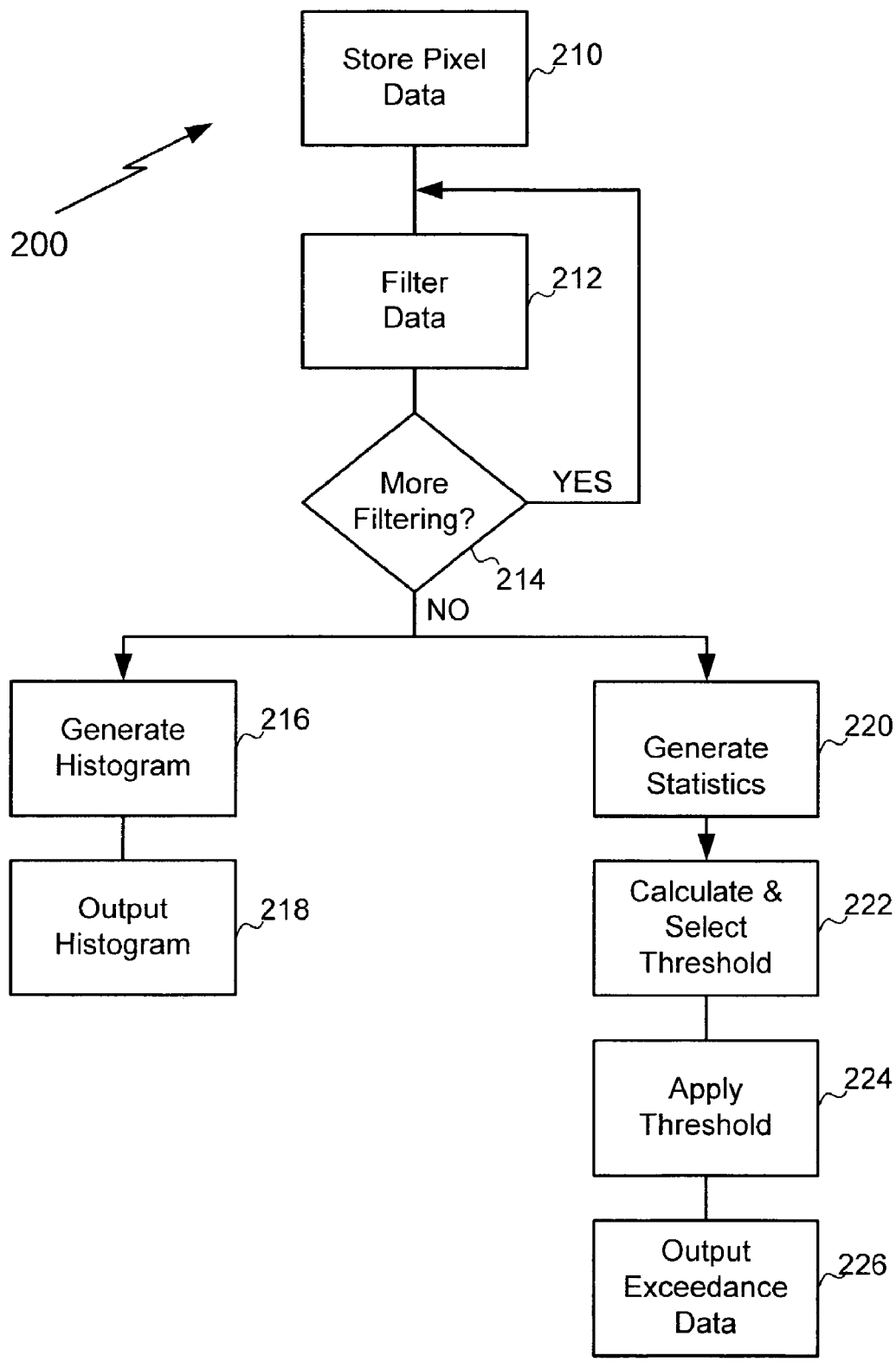
FIG. 2 is a flow diagram illustrating a typical image segmentation operation in accordance with a preferred embodiment of the present invention.

FIG. 2 is a flow diagram illustrating a typical image segmentation operation in accordance with a preferred embodiment of the present invention. The process is generally shown by reference 200 and comprises the following steps. At step 210 pixel data is stored, preferably in a buffer. Then, at step 212, the data stored in the buffer is filtered either, e.g., to smooth the image or to detect edges of an image. Then, at step 214 it is determined whether additional filtering might be desirable. For example, in accordance with the present invention, it is possible to programmatically modify the coefficients of the filter so that the filter can be used again to filter data, but in a different manner. For example, if the first filtering step smoothed an image, then a second pass through the filter might be operable to detect edges of an image. If no more filtering is desired, then at step 216 a histogram of the data is generated. At step 218 the histogram is output, typically, to a general purpose processor that is operating in conjunction with the apparatus of the present invention.

Substantially simultaneously, at step 220 a set of statistics is generated with respect to the data stored in the buffer. These statistics can be based on the original data stored in the buffer or on post filtering data which is again preferably stored in the buffer. After statistics are generated, a threshold is calculated and selected at step 222. In accordance with the present invention, a threshold can be based on the statistics just generated, or may be instead programmatically set by the general purpose processor via registers in a control module or mechanism. Once the desired threshold is selected it is applied, at step 224, to the data stored in the buffer. The results of the application of the threshold to this data are what are termed "exceedance data," which is output together with the histogram to the general purpose processor or another DSP stage separate from the general purpose processor. The histogram data can be used by the general purpose processor as may be desired.

As will be readily appreciated by those skilled in the art, the present invention is particularly efficient in performing an image segmentation process due to the facility with which the filter can be employed and the fact that different thresholds can be applied. More particularly, by enabling multiple passes of the data through an FPGA by controlling data flow from and to buffer 12, it is possible to maximize FPGA resources that are allocated to image processing and maximize flexibility with respect to image size.

The foregoing disclosure of the preferred embodiments of the present invention has been presented for purposes of illustration and description. It is not intended to be exhaustive or to limit the invention to the precise forms disclosed. Many variations and modifications of the embodiments described herein will be apparent to one of ordinary skill in the art in light of the above disclosure. The scope of the invention is to be defined only by the claims appended hereto, and by their equivalents.

Further, in describing representative embodiments of the present invention, the specification may have presented the method and/or process of the present invention as a particular sequence of steps. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the specification should not be construed as limitations on the claims. In addition, the claims directed to the method and/or process of the present invention should not be limited to the performance of their steps in the order written, and one skilled in the art can readily appreciate that the sequences may be varied and still remain within the spirit and scope of the present invention.

What is claimed is:

1. A digital signal processing apparatus, comprising:
   a buffer memory operable to store pixel data;
   a histogram generating module in communication with the buffer memory, the histogram generating module operable to generate a histogram of the pixel data;
   a statistics generating module in communication with the buffer memory, the statistics generating module operable to generate statistics regarding the pixel data;
   a threshold select module for selecting one of a plurality of thresholds and an apply threshold module for applying the selected threshold to data stored in the buffer; and
   a control module for controlling each of the buffer, histogram, statistics and threshold modules by updating registers in at least one of the buffer, histogram, statistics and threshold modules to cause a re-flow of the data through at least one of the buffer, histogram, statistics and threshold modules, wherein a portion of the data is passed through at least one of the buffer, histogram, statistics and threshold modules at least twice based on the statistics generated for the portion of the re-flowed data, wherein a histogram and exceedance data that exceed the selected threshold are provided to a downstream general purpose processor.

2. The apparatus of claim 1, further comprising a filter.

3. The apparatus of claim 2, wherein the filter is a spatial filter.

4. The apparatus of claim 2, wherein the filter comprises programmable coefficients.

5. The apparatus of claim 2, wherein the filter is operable to be at least one of a smoothing filter and an edge detecting filter.

6. The apparatus of claim 1, wherein the histogram is comprised of 1024 bins.

7. The apparatus of claim 1, wherein the statistics generating module is operable to calculate at least a mean and standard deviation.

8. The apparatus of claim 1, wherein the selected threshold is settable by the general purpose processor.

9. The apparatus of claim 1, wherein the selected threshold is based on the generated statistics.

10. The apparatus of claim 1, wherein two sets of exceedance data are provided to the downstream general purpose processor.

11. The apparatus of claim 10, wherein a difference between a first set and a second set of exceedance data is based on an application of an offset value associated with the threshold.

12. An image segmentation apparatus, comprising:
a buffer memory operable to store pixel data;
a digital filter in communication with the buffer memory;
a histogram generating module in communication with the buffer memory, the histogram generating module operable to generate a histogram of the pixel data;
a statistics generating module in communication with the buffer memory, the statistics generating module operable to generate statistics regarding the pixel data;
a threshold select module for selecting one of a plurality of thresholds and an apply threshold module for applying the selected threshold to data stored in the buffer; and
a control module for controlling each of the buffer, histogram, statistics and threshold modules by updating registers in at least one of the buffer, histogram, statistics and threshold modules to cause a re-flow of the data through at least one of the buffer, histogram, statistics and threshold modules, wherein a portion of the data is passed through at least one of the buffer, histogram, statistics and threshold modules at least twice based on the statistics generated for the portion of the re-flowed data,
wherein a histogram and exceedance data that exceed the selected threshold are provided to a downstream general purpose processor.

13. The apparatus of claim 12, wherein the filter is a spatial filter.

14. The apparatus of claim 12, wherein the filter has programmable coefficients.

15. The apparatus of claim 12, wherein the filter is operable to be at least one of a smoothing filter and an edge detecting filter.

16. The apparatus of claim 12, wherein the histogram is comprised of 1024 bins.

17. The apparatus of claim 12, wherein the statistics generating module is operable to calculate at least a mean and standard deviation.

18. The apparatus of claim 12, wherein the selected threshold is settable by the general purpose processor.

19. The apparatus of claim 12, wherein the selected threshold is based on the generated statistics.

20. The apparatus of claim 12, wherein the two set of exceedance data are provided to the downstream general purpose processor.

21. The apparatus of claim 20, wherein a difference between a first set and a second set of exceedance data is based on an application of an offset value associated with the threshold.

22. A method of performing image segmentation, comprising:
storing pixel data;
controlling and setting programmable filter coefficients and digitally filtering the data at least one time;
generating a histogram of the data;
generating statistics based on the data;
selecting one of a plurality of thresholds, at least one of the plurality of thresholds being calculated based on the statistics;
applying a selected threshold to the data;
outputting the histogram; and
outputting exceedance data that exceed the selected threshold, the exceedance data representing, at least partially, an image segmented from the pixel data, wherein controlling and setting programmable filter coefficients and digitally filtering the data at least one time comprises:
resetting the programmable filter coefficients based on the statistics;
re-inputting the data back to a filter; and
filtering the re-input data with the reset programmable filter coefficients.

23. The method of claim 22, further comprising modifying the threshold level on a per pixel frame basis.

24. The method of claim 22, further comprising calculating exceedance data based on an offset value added to the selected threshold.

25. The method of claim 24, wherein two sets of exceedance data are output.

26. The method of claim 22, further comprising receiving instructions from a general purpose processor.

27. The method of claim 22, wherein the number of coefficients is 25 for a filter having a 5×5 pixel mask.

* * * * *